United States Patent Office 3,207,741
Patented Sept. 21, 1965

3,207,741
PREPARATION OF 1,4-CIS-POLYDIENES WITH A GROUP VIII METAL SALT-MONOOLEFINIC ALCOHOL-GROUP II OR III ORGANOMETAL CATALYST
Johannes Schafer, Harald Blumel, and Frederico Engel, all of Kreis Recklinghausen, Germany, assignors to Chemische Werke Huls Aktiengesellschaft, Kreis Recklinghausen, Germany
No Drawing. Filed June 19, 1961, Ser. No. 126,412
Claims priority, application Germany, June 21, 1960, C 21,731
7 Claims. (Cl. 260—94.3)

The present invention relates to the production of 1,4-cis-polydienes by polymerizing dienes in contact with improved catalysts.

It is known that by polymerizing dienes such as butadiene and isoprene in contact with a catalyst composed of organometallic compounds of a metal of Groups II and III of the Mendeleef Periodic System, together with a compound of a metal from Group VIII of the Periodic System, there are obtained polymerizates with more than 90% 1,4-cis configuration, and with a gel content of less than 5%.

It is possible to employ the Group VIII metallic compounds in the form of soluble heavy metal compounds such as fatty acid salts or alcoholates, a particularly advantageous form being soluble heavy metal salts containing alcohols of crystallization. The compounds of the Group VIII metal can be suspended in inert hydrocarbons, or can be dissolved in polar organic solvents.

Whereas the process employing these catalysts yields some satisfactory products, there is still room for improvement with respect to both the properties of the polymer, and the yield of 1,4-cis configuration in the polymerizate.

An object of this invention, therefore, is to provide an improved process for producing 1,4-cis-polydienes.

Another object is to provide novel catalysts for use in the new process.

Still another object is to provide polymers having improved properties.

Other objects and advantages of the present invention will become apparent upon further study of the specification and the appended claims.

To accomplish the objects of this invention, it is necessary to modify the catalyst by incorporating unsaturated alcohols in the Group VIII metal compounds. In other words, it has been discovered that the polymerization of dienes can be advantageously conducted by employing a mixed catalyst having an organometallic compound of Groups II and III of Mendeleef's Periodic System, together with a compound of a metal of Group VIII of Mendeleef's Periodic System, said latter compound containing an unsaturated alcohol. The catalyst can be either suspended in an inert liquid, or it can be dissolved in a suitable solvent.

The dienes which can be utilized in the present invention include conjugated dienes, particularly 1,3-butadiene and isoprene. Preferably, the conjugated dienes are hydrocarbons containing 4–8 carbon atoms, such as hexadiene-1,3 and octadiene-1,3.

Among the inert diluents and solvents that can be employed in this process are aliphatic, alicyclic, and aromatic hydrocarbons and mixtures thereof; for example, butane, butene, hexane, toluene, benzene and isopropyl cyclohexane can be used to advantage. Furthermore, halogenated hydrocarbons, such as tetrachloroethane are also suitable. In general, it is preferred to employ a ratio of catalyst to diluent or solvent of about one part by weight of catalyst to 100 to 1,000,000 parts by weight of diluent or solvent, preferably 500 to 100,000 parts by weight.

With respect to the mixed catalyst, it is preferred to use a ratio of a catalyst to the diene to be polymerized of about one part by weight catalyst to 10 to 100,000 parts diene, preferably 50 to 10,000 parts by weight.

The organometallic compound of Groups II and III of the Periodic System comprises a great many possible compounds. For example, aluminum alkyls and aryls, gallium, indium and beryllium alkyls and aryls may be effectively utilized. Furthermore, complex compounds of these metals, such as lithium aluminum tetraethyl, and sodium beryllium tetraethyl may also be used, as well as their molecular compounds with ethers, thioethers or amines. Still further, alkyls and aryls of calcium, magnesium, strontium and barium can be employed. For a more comprehensive teaching of the various Groups II and III organometallic compounds that can be used in the present invention, reference is directed to Linear and Stereoregular Addition Polymers: Polymerization with Controlled Propagation by Norman G. Gaylord and Herman F. Mark, Interscience Publishers, Inc., New York, 1959. This book, particularly Chapter 7, discloses a multitude of Groups II and III organometallic compounds which can be employed in Ziegler-type catalysts. It is to be understood that this invention contemplates the use of any of these various organometallic compounds in conjunction with a monoolefinic-alcohol-modified Group VIII compounds.

It has been found, however, that alkylaluminum sesquihalides, particularly ethylaluminium sesquihalides are preferred co-catalysts. In general, the alkyl substituents of these co-catalysts can contain from 1 to 10 carbon atoms. These compounds, such as methylaluminumsesquihalogenide, isobutylaluminsesquihalogenide and octylaluminumsesquihalogenide can be prepared by dissolving metallic aluminum in an alkyl halide and are apparently a mixture of dialkylaluminum halide and an alkylalumimum dihalide.

In general, the ratio of the Groups II and III compound to the Group VIII compound is one mol of Group VIII compound to 1 to 10,000, preferably 5 to 5000 mols of the Groups II or III compound.

As compounds of the metals of Group VIII of Mendeleef's Periodic System, in general, all types of compounds can be employed. It is preferred, however, to use compounds of iron, nickel, and particularly cobalt. These metal compounds can be employed in the form of salts of inorganic or organic acids, such as salts of hydrochloric acid, bromic acid, iodic acid, naphthenic acid, and higher fatty acids containing 1 to 20 carbon atoms, such as formic acid, acetic acid, propionic acid, palmitic acid and stearic acid. These salts are treated with unsaturated alcohols and are converted into compounds which are soluble in inert diluents or solvents. In general, it is desirable to react about 3 to 1,000 mols of alcohol to one mol of salt, but it is preferred to employ 3 to 12 mols of alcohol to one mol of salt. A great many unsaturated alcohols are suitable for the present invention, but it has been discovered that it is preferable to utilize allyl alcohol, 1-butenol-4, 2-butenol-4 and the unsaturated alcohols of the $C_5$ series.

The production of the alcohol modified Group VIII compounds is extremely simple. For example, by merely mixing 6 mols of anhydrous allyl alcohol with one mol of anhydrous cobalt chloride, wherein the cobalt has a valence of 2, there is obtained a liquid homogeneous mixture which can be mixed with inert diluents or solvents. In general, this reaction can be conducted at any convenient temperature at normal pressure, but for an increased rate of reaction, it is preferable to operate the process at reflux conditions.

It is also possible to modify the Group VIII compounds by utilizing a mixture of unsaturated alcohols. For example, a cobalt catalyst can be modified by mixtures of allyl alcohol with, for example, 1-butenol-4 or even mixtures of the various butenols. This is accomplished for example, by mixing prior to use, one mol of the cobalt compound with n mols of 1-butenol-4 and (6-n) mols allyl alcohol; or one mol of the cobalt compound can be mixed with n mols 2-butenol-4 and (6-n) mols 1-butenol-4. The ratio of the various alcohol compounds can be varied at will, providing that the resultant product is adequately soluble in benzene.

It is to be noted that of all the unsaturated alcohols, it has been discovered that allyl alcohols and the butenols yield the highest solubility to the cobalt compounds. Consequently, it is advisable and desirable to employ a substantial proportion of these unsaturated alcohols in the manufacture of the alcohol-modified Group VIII compounds.

It is to be noted that the addition of the unsaturated alcohols to the Group VIII metal salts results in the formation of a salt having alcohols of crystallization bonded to the salt, as in the same manner as water of crystallization. These salts can be represented by the following formula:

$$MXA_n$$

wherein M is a metal of the Group VIII of the Periodic Table; X is an anion such as a chloride ion; and A is the unsaturated alcohol as previously described; and $n$ is the number of mols of alcohol attached to the salt. In general, $n$ varies from 1 to 6, an preferably 2-6. Specific examples of these salts include $CoCl_2 \times 2ROH$;

$$CoCl_2 \times 4ROH, \quad CoCl_2 \times 6ROH; \quad CoBr_2 \times 6ROH$$

$$CoI_2 \times ROH; \quad CoCl_2 \times 3R_2OH + 3R_2OH \text{ and}$$

$$CoCl_2 \times 2R_1OH + 4R_3OH.$$

Instead of employing alcohols in the form of alcohols of crystallization, it is also possible to employ alcoholates of iron, nickel and cobalt using the same unsaturated alcohols. Specifically, examples of these alcoholates include $(C_2H_3O)_2Co$, $(CH_3O)_2Co$ and $(C_4H_9O)_2Co$.

Furthermore, it is even possible to employ mixtures of individual unsaturated alcohols or mixtures thereof with saturated alcohols, particularly saturated aliphatic and cycloaliphatic alcohols. Thus, it is possible to use either salts containing both saturated and unsaturated alcohols of crystallization; or to use alcoholates comprising those produced from mixtures of saturated and unsaturated alcohols. In general, it is preferred to employ a ratio of saturated to unsaturated alcohols of about one mol saturated alcohol to 1 to 5, preferably 1 to 3 mols unsaturated alcohol. Specific examples of mixtures of saturated and unsaturated alcohols include the following mixtures: 20% allyl alcohol and 80% n-butanol; 50% 1-butenol-4+50% n-butanol; 40% allyl alcohol+60% n-butanol; and 2-butenol-4+40% iso-butanol.

Whereas it is possible to preparee a great many catalysts based on the preceding description of the various components and their ratios, it should be appreciated that all of these compositions will be benefited by the inclusion of unsaturated alcohols as compared to being composed entirely of saturated alcohols. To exemplify applicants' catalysts, the following specific catalyst compositions are submitted:

(1) $(C_2H_5)_{1.5}AlCl_{1.5}+CoCl_2 \times 6$ allylalcohol (ratio: 250:1)
(2) $(C_2H_5)_{1.5}AlCl_{1.5}+CoCl_2 \times 4$ allylalcohol+2 n-butanol (ratio: 100:1)
(3) $(iso-C_4H_9)_{1.5}AlCl_{1.5}+CoCl_2 \times 3$ allylalcohol (ratio: 300:1)
(4) $(C_2H_5)_{1.5}AlBr_{1.5}+CoBr_2 \times 6$ 2-butenol-4 (ratio: 500:1)

The process of this invention is conducted by contacting the diene with the catalsyt under polymerizing conditions. Preferably, the temperature for the polymerization is −25 to +100° C.; the pressure is up to eight atmospheres; and the time of polymerization is from 30 to 600 minutes. The resulting polymerizate is then processed in a conventional manner by removing catalyst residues and any residual solvent or diluent. The purified polymer is then dried.

The resulting polymers are characterized by improved properties, particularly with respect to tensile strength, elastic recovery, hysteresis, and ability to withstand flexing. These improved properties are attained without any compromise of other valuable properties of the polymers, such as the content of the 1,4-cis configuration. In general, the polymers are incorporated in vulcanizates. Based on 100 parts by weight of polymer, the vulcanizates include 20–100 parts by weight of carbon black, 2–50 parts by weight softener or extender oil, 1–30 parts by weight zinc oxide, and minor quantities of the usual substances found in a vulcanizate recipe, such as stearic acid, protective waxes, oxidation inhibitors, accelerators and sulfur.

These vulcanizates are particularly advantageous when fabricated into articles which are subjected to periodic stress reversal, such as vehicle tires, playing balls, packing, and generally all elements which require elasticity for their proper functioning. These articles, when fabricated from polymers of the instant invention, display a longer life and better elastic properties than articles made with conventional polymers. As a matter of fact, improved properties of final products can be obtained when a relatively small quantity, such as 25%, of the polymers of the instant invention are incorporated with 75% of conventional polymers, such as natural rubber, synthetic polyisoprene, polybutadiene, GR–S and other mixed polymers of butadiene and isoprene.

To assist those skilled in the art, the following specific embodiments of this invention are presented, but it is to be understood that these embodiments are merely exemplary, and that the invention is not to be limited thereto with respect to monomers, catalyst components, ratios or reaction conditions.

EXAMPLE I 150,000 parts by weight of butadiene are added to a pressure vessel holding a mixture of 1,000,000 parts by weight of benzene, 2,500 parts by weight of ethylaluminum sesquichloride and 10 parts by weight of an addition compound of 1 mol cobalt chloride and 6 mols allyl alcohol.

The cobalt compound is produced by inserting into a three neck flask provided with reflux condenser, stirrer and drip funnel, one mol water-free cobalt chloride and 6 mols allyl alcohol. Under stirring, heating takes place until all cobalt chloride has gone into solution; and boiling takes place with reflux. The solution which is still hot is now mixed with anhydrous benzene until a total volume of 2 liters is reached. This 0.5 molar solution serves as a standard solution and is further diluted according to its use in order to attain an exact concentration. The solution can be stored without any danger of the cobalt chloride crystallizing.

Instead of using 6 mols allyl alcohol, it is also possible to use 8, 10, 12 and more mols of this alcohol or 3 and more mols 1-butenol-4 and 2-butenol-4 or other unsaturated alcohols. In these cases the method of preparation remains the same.

Polymerization is carried out at 30° C. for about one hour. By adding one million parts by weight of isopropanol, the polymerization is then terminated and the polymerizate is precipitated. The yield is 100%; the viscosity (Mooney) ML4 is 54; 1,4-cis is 98%; 1,4-trans is 1%; 1,2 is 1%; gel content is 0%.

The polymers produced according to this example in two parallel experiments are called polymerizate A and B below. They differ from each other only in the Mooney value. Polymerizate A has an ML4-value of 45, polymerizate B has an ML4-value of 59. Furthermore, according to the method of the example, but using one mol of cobaltic chloride with 6 mols of n-butanol as the Group VIII component, the polymerizate C is produced. Consequently, polymerizates A and B are to be compared with polymerizate C.

From these polymerizates A, B, and C, three mixtures L1, L2 and L3 of the type of tire-tread mixtures are produced in order to determine the properties of the polymer for ultimate use. The components of these mixtures are compiled in Table I (the numbers are in parts by weight).

*Table I*

| Components | Tire-tread mixtures | | |
|---|---|---|---|
| | L1 | L2 | L3 |
| Polymerizate A | 100 | | |
| Polymerizate B | | 100 | |
| Polymerizate C | | | 100 |
| Stearic acid | 2 | 2 | 2 |
| Zinc oxide | 3 | 3 | 3 |
| Aromatic processing oil (aromatics 41%, VDK 0.963) | 8 | 8 | 8 |
| ISAF-Carbon black | 45 | 45 | 45 |
| Ozokerite | 1 | 1 | 1 |
| Phenyl-beta-naphthylamine | 1 | 1 | 1 |
| p-Phenylendiamine derivatives (N-phenyl-N'cyclohexyl p-phenylen dianin) | 1 | 1 | 1 |
| Sulfur | 2.5 | 2.5 | 2.5 |
| N-cyclohexyl-2-benzothiazylsulfenamide | 0.6 | 0.6 | 0.6 |

Further, from the polymerizates A, B and C blended with natural rubber, three mixtures L4, L5, and L6 are produced, the components of which are compiled in Table II.

*Table II*

| Components | Tire-thread mixtures | | |
|---|---|---|---|
| | L4 | L5 | L6 |
| Polymerizate A | 50 | | |
| Polymerizate B | | 50 | |
| Polymerizate C | | | 50 |
| Natural rubber sheets Defo-plasticity about 1000/30 | 50 | 50 | 50 |
| Stearic acid | 2 | 2 | 2 |
| Zinc oxide | 3 | 3 | 3 |
| Aromatic processing oil (aromatics 46%, VDK 0.963) | 8 | 8 | 8 |
| ISAF-Carbon black | 45 | 45 | 45 |
| Ozokerite | 1 | 1 | 1 |
| Phenyl-beta-naphthylamine | 1 | 1 | 1 |
| p-Phenylendiamine derivatives (N-phenyl-N'-cyclohexyl p-phenylen diamin) | 1 | 1 | 1 |
| Sulfur | 2.5 | 2.5 | 2.5 |
| N-cyclohexyl-2-benzothiazylsulfenamide | 0.6 | 0.6 | 0.6 |

The basic mixtures without sulphur and accelerator are prepared in a mixer of the type GK2 by Werner and Pfleiderer, at a number of rotations of the faster running rotor of 40 per minute, a cooling water temperature of 50° C. and a total mixing time of 10 minutes. The discharge temperatures of the mixtures are not above 140° C. The finished mitxures are pulled out to a sheet and blended with sulphur and accelerator in the tabulated proportions on a laboratory rolling mill having a fraction index of 1:1.15 and a cooling water temperature of 50° C. The sheet is then vulcanized at 150° C. during the course of thirty minutes. After vulcanization, annular test bodies with an outer diameter of 52.6 mm., a ring width of 4 mm. and a thickness of 4 mm. are punched out.

In Table III the physical values of the test bodies of mixtures L1 to L6 are compiled.

*Table III*

| Vulcanizates from mixtures | Tensile strength (kg./cm.$^2$) | Elongation, percent | Modulus (kg./cm.$^2$) | | Hardness (° Sh) | Rebound elasticity | | Defo-plasticity of the raw polymerizate or mixture |
|---|---|---|---|---|---|---|---|---|
| | | | 300% | 500% | | 22° C. | 75° C. | |
| L1 | 170 | 555 | 58 | 143 | 58 | 49 | 52 | 475/26 |
| L2 | 173 | 555 | 57 | 149 | 57 | 48 | 52 | 700/30 |
| L3 | 167 | 595 | 56 | 131 | 56 | 45 | 48 | 550/33 |
| L4 | 229 | 630 | 69 | 158 | 58 | 46 | 55 | 450/21 |
| L5 | 230 | 645 | 68 | 155 | 56 | 45 | 53 | 525/24 |
| L6 | 211 | 645 | 64 | 144 | 55 | 43 | 52 | 525/27 |

The vulcanizates obtained from the mixtures L1 to L6 are tested in the St. Joe-Flexometer under the following conditions: number of rotations is 905 per minute, vertical load is 13.5 kg./cm., horizontal deflection is 8 mm. The results with respect to the running time in minutes and the temperature development are compiled in Table IV.

*Table IV*

| Vulcanizates from mixtures | Running time in minutes | Temperature development in ° C. after— | | |
|---|---|---|---|---|
| | | 2 min. | 4 min. | 8 min. |
| L1 | 9 | 105 | 135 | 169 |
| L2 | 9 | 105 | 135 | 171 |
| L3 | 7 | 125 | 173 | 205 |
| L4 | 9 | 110 | 134 | 163 |
| L5 | 9 | 104 | 130 | 164 |
| L6 | 7 | 119 | 141 | 185 |

EXAMPLE II

Into a stirring autoclave 1,000,000 parts by weight benzol, 2,500 parts by weight of ethylaluminum sesquichloride, 10 parts by weight of an addition compound of 1 mol cobalt chloride and 6 mols 1-butenol-4, and 150,000 parts by weight of butadiene are inserted. At a polymerization temperature of 25–30° C., the reaction is finished in about one hour. As processed in Example I, a polymerizate is obtained having a Mooney-viscosity (ML-4), of 46 at a yield of about 90%. 98% of the double compounds have the 1,4-cis configuration.

Similar results are obtained when the examples are repeated with isoprene, and other polydienes having from 4–8 carbon atoms. Likewise, similar results are obtained, when other catalyst compositions prepared in accordance with the general and/or the specific teachings of this invention, are substituted for the catalyst employed in Examples I and II.

It will be understood that the invention is susceptible to modification in order to adapt it to different usages and conditions and, accordingly, it is desired to comprehend such modifications within the invention as may fall within the scope of the appended clams.

What is claimed is:
1. A catalyst composition comprising an organo-metallic compound selected from the group consisting of alkyl-aluminumhalide and aryl-aluminumhalide, and a mixture of a salt of a metal selected from the group consisting of cobalt and nickel with a mono-olefinic alcohol, containing from 3 to 6 carbon atoms, the mol ratio of said organo-metallic compound to said mixture of metal salt with a mono-olefinic alcohol being about 1:1 to 1:10,000, respectively.

2. The catalyst of claim 1, wherein the organometallic compound is ethylaluminum sesquichloride.

3. The catalyst of claim 1, wherein the organometallic compound is ethylaluminum sesquichloride and the said mixture is selected from the group consisting of $$CoCl_2 \cdot (CH_2=CH-CH_2-OH)_6$$

and $CoCl_2 \cdot (CH_2=CH-CH_2-CH_2-OH)_6$.

4. A process for polymerizing a conjugated diene having from 4 to 8 carbon atoms to polymers having a 1,4-cis configuration, which comprises the step of contacting said diene under polymerizing conditions with the catalyst composition of claim 1.

5. A process for polymerizing a conjugated diene having from 4 to 8 carbon atoms to polymers having a 1,4-cis configuration, which comprises the step of contacting said diene under polymerizing conditions with the catalyst composition of claim 3.

6. The process of claim 4, wherein the diene is butadiene.

7. The process of claim 5, wherein the diene is butadiene.

References Cited by the Examiner

UNITED STATES PATENTS

| 2,953,556 | 9/60 | Wolfe | 260—94.3 |
| 2,977,349 | 3/61 | Brockway | 260—94.3 |

FOREIGN PATENTS

| 1,175,201 | 11/58 | France. |
| 916,000 | | Great Britain. |
| 594,618 | 6/59 | Italy. |

JOSEPH L. SCHOFER, *Primary Examiner.*

MORRIS LIEBMAN, *Examiner.*